(12) United States Patent
Sevanto et al.

(10) Patent No.: US 6,813,638 B1
(45) Date of Patent: Nov. 2, 2004

(54) METHOD AND ARRANGEMENT FOR PREPARING FOR THE TRANSMISSION OF MULTIMEDIA-RELATED INFORMATION IN A PACKET-SWITCHED CELLULAR RADIO NETWORK

(75) Inventors: Jarkko Sevanto, Helsinki (FI); Mikko Puuskari, Helsinki (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/532,551

(22) Filed: Mar. 22, 2000

(30) Foreign Application Priority Data

Mar. 22, 1999 (FI) .................................................. 990640

(51) Int. Cl.[7] .............................................. G06F 15/16
(52) U.S. Cl. ...................................................... 709/227
(58) Field of Search ................................. 709/227, 230, 709/245; 370/356, 469; 455/414, 466, 550

(56) References Cited

U.S. PATENT DOCUMENTS

| | | | | |
|---|---|---|---|---|
| 6,081,513 | A | * | 6/2000 | Roy ............................. 370/260 |
| 6,233,458 | B1 | * | 5/2001 | Haumont et al. ............ 455/445 |
| 6,304,564 | B1 | * | 10/2001 | Monin et al. ................ 370/338 |
| 6,370,399 | B1 | * | 4/2002 | Phillips ........................ 455/564 |
| 6,397,259 | B1 | * | 5/2002 | Lincke et al. ................ 709/236 |
| 6,434,133 | B1 | * | 8/2002 | Hamalainen ................. 370/338 |
| 6,469,998 | B1 | * | 10/2002 | Burgaleta Salinas et al. ............................ 370/338 |
| 6,496,690 | B1 | * | 12/2002 | Cobo et al. .................. 455/408 |
| 6,512,756 | B1 | * | 1/2003 | Mustajärvi et al. .......... 370/341 |
| 6,654,891 | B1 | * | 11/2003 | Borsato et al. .............. 713/201 |

FOREIGN PATENT DOCUMENTS

| WO | WO 98/19438 | 5/1998 |
|---|---|---|
| WO | WO 98/32301 | 7/1998 |
| WO | WO 99/41920 | 8/1999 |

OTHER PUBLICATIONS

Harry Newton, "Newton's Telecom Dictionary", CMP Books, 181t Edition, p. 561.*

Aiken et al., "Microsoft Computer Dictionary", Microsoft Press, p. 397.*

Kim Breitfelder, Don Messina, "IEEE 100:The Authoritative Dictionary of IEEE Standards Terms", 7th Edition, IEEE Press, p. 804.*

Neil Hart; Protocol Validation and Implementation: A Design Methodology Using LOTUS and ROOM; Aug. 1998, pp. 92–113.*

"MHTP–A Multimedia High–Speed Transport Protocol", Huang et al., 1992, Proceedings of the Global Telecommunications Conference, pp. 1364–1368.

"Concepts, Services, and Protocols of the New GSM Phase 2+ General Packet Radio Service", Brasche et al., Aug. 1, 1997, IEEE Communications Magazine, vol. 35, No. 8, pp. 94–104.

* cited by examiner

Primary Examiner—Glenton B. Burgess
Assistant Examiner—Kimberly Flynn
(74) Attorney, Agent, or Firm—Perman & Green, LLP (57) ABSTRACT

A method is provided for transmitting multimedia-related information between a first device and a second device coupled to a packet-switched data transmission network, A first protocol stack (201, 202, 203, 204, 205, 206, 207) is defined for the first device and a second protocol stack (251, 252, 253, 254, 255, 256) is defined for the second device. The protocol stacks consist of layers and serve the arranging of the mutual exchange of information between the first device and the second device. An Internet Protocol layer (206, 255) is defined for the transmission of packetized data as a certain layer in the first protocol stack and a certain layer in the second protocol stack. A multimedia messaging transport protocol layer (207, 256) is also defined as a certain layer above the Internet Protocol layer (206, 255) in the first and second protocol stacks. Multimedia-related information is exchanged between the multimedia messaging transport protocol layer (207) in die first device and the multimedia messaging transport protocol layer (256) in the second device through the use of the Internet Protocol layer (206, 255) as well as other lower layers in the first and second protocol stacks.

12 Claims, 4 Drawing Sheets

METHOD AND ARRANGEMENT FOR PREPARING FOR THE TRANSMISSION OF MULTIMEDIA-RELATED INFORMATION IN A PACKET-SWITCHED CELLULAR RADIO NETWORK

TECHNOLOGICAL FIELD

The invention concerns generally the use of certain protocols and services for conveying certain types of information between the different nodes of a telecommunication network. Especially die invention concerns the preparations for and execution of the transmission of multimedia-related information between a terminal of a cellular radio network and a node computer of a fixed packet-switched network.

BACKGROUND OF THE INVENTION

Multimedia is generally understood as the synchronized presentation of audiovisual objects to a user. It is typical to multimedia-related information that it may contain elements of highly different nature, lice text, still images, simple graphical elements, video and sound.

MMS or Multimedia Messaging Service is a proposed way for arranging the delivery of messages containing multimedia-related information from one telecommunication device to another. With "multimedia-related" information we mean both the actual payload data that represents presentable objects and the control information that tells a presentation device how to handle the payload data. According to the proposals, MMS should be applicable for conveying such messages to and from the terminals of packet-switched cellular radio networks such as GPRS (General Packet Radio Service) and the packet-switched parts of UMTS (Universal Mobile Telecommunication System) in a store-and-forward manner much like the SMS (Short Messaging Service) text messages are conveyed in the second generation digital cellular networks, e.g. GSM (Global System for Mobile telecommunications).

Figure 1:
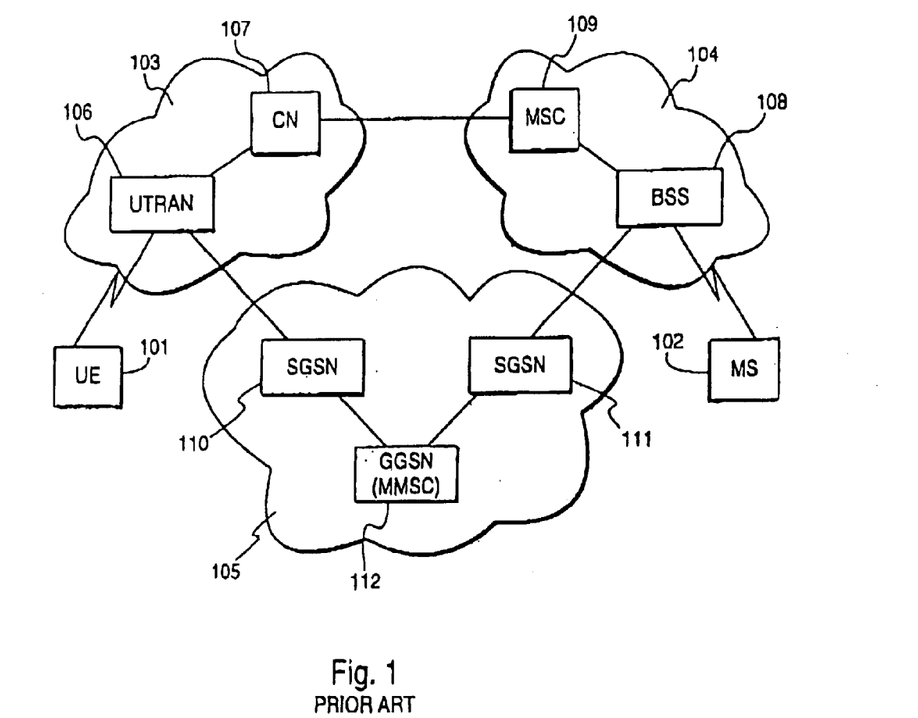
FIG. 1 illustrates some known system aspects of packet-switched data transmission.

FIG. 1 illustrates some system aspects of a known proposal for arranging the transmission of MMS messages between two mobile terminals (or generally: terminal arrangements) 101 and 102. In FIG. 1 each terminal is operating in a cellular telephone system of its own: terminal 101 is a UMTS terminal operating in a UMTS network 103 and terminal 102 is an enhanced GSM terminal operating in an enhanced GSM network 104. From both networks there is a connection to a GPRS network 105. The UMTS network 103 comprises a UTRAN or UMTS Terrestrial Radio Access Network 106 as well as a CN or Core Network 107. In the enhanced GSM network 104 a BSS or Base Station Subsystem 108 and an MSC or a Mobile Switching Centre 109 are shown. The detailed structure of the network elements is unessential to the present invention, but it is known that for example a UTRAN consists of a number of Radio Network Subsystems, each of which in turn comprises a Radio Network Controller and a number of Node Bs roughly corresponding to base stations. A BSS in turn comprises a Base Station Controller and a number of Base Transceiver Stations operating under it. Various mixed-mode cellular telephone systems are possible; for example the BSS 108 might operate under the same CN as the UTRAN 106. The terminals could also be exactly similar terminals operating close to each other in a single cell.

In FIG. 1 there is a connection both from the UTRAN 106 and from the BSS 108 to a corresponding SGSN or Serving GPRS Support Node 110 and 111. Both of these are in turn coupled, through the GPRS trunk lines, to a GGSN or Gateway GPRS Support Node 112 which here also operates as an MMSC or a Multimedia Messaging Service Center. In analogy with the known SMS arrangements a terminal 101 may transmit an MMS message by identifying both the intended recipient's terminal 102 and the MMSC through which the message is to be transmitted (actually the latter may even be left out if there is a default MMSC for each terminal). A Packet Control Unit or a corresponding functionality in the UTRAN 106 takes the MMS transmission and routes it through the current SGSN 110 to the MMSC 112 which stores the MMS message and commences the attempts for delivering it to the intended recipient. If there is an existing connection to the recipient's terminal 102 the MMSC may deliver the message through the corresponding SGSN 111 and the BSS 108 to the terminal 102. If, however, the terminal 102 is temporarily shut off, out of coverage or otherwise unreachable, the MMSC retries the delivery at certain time intervals until either the message is successfully delivered or a timeout expires indicating that the message is obsolete and can be deleted undelivered. A positive or negative acknowledgement, depending on the success in delivery, may be returned through the MMSC to the transmitting terminal 101 if required.

At the time of filing this patent application there does not exist an unambiguously defined way of using the lower-level protocol layers and PDP Contexts (Packet Data Protocol) in the terminals and fixed network devices to convey the MMS messages. Somewhere at a relatively high level in the protocol stacks of both the terminals and tie MMSC there must be an MMS-TP (Multimedia Messaging Service-Transport Protocol) entity that uses the services offered by the lower level protocols to convey an MMS message first from the transmitting device to the MMSC and then further to the receiving device. The actual name of the protocol entity may also be something else. Additionally the MMS messages must be mapped into PDP Contexts of certain type; the mapping will be closely related to the choice of lower protocol layers under the MMS-TP entity. We anticipate that network operators will require the MMS messaging to be distinguishable from other forms of packet-switched data transmission in order to arrange for a suitable charging scheme for the MMS services.

A prior art solution which has been proposed for conveying MMS messages is to have a PDP Type separately defined for MMS, and to set up a PDP Context of that type between a terminal and an MMSC each time an MMS message has to be conveyed in either direction. This approach has the drawback of requiring a considerable amount of completely new specification and standardization work. Additionally new PDP Types are only very reluctantly accepted to the already frozen standards.

SUMMARY OF THE INVENTION

It is an object of the present invention to provide a feasible method and a corresponding arrangement for setting up and configuring a connection suited for conveying MMS messages between terminals and MMSCs. It is an additional object of the invention that the proposed method does not require exhaustive respecification in the framework of existing standards and proposals.

The objects of the invention are met by using the IP or Internet Protocol PDP Context type, known as such, to carry a data stream comprising the required multiedia-related information, and by configuring the IP address of a MMSC to a terminal dynamically, most advantageously as a part of the PDP Context activation process.

The method according to the invention is characterized in that it comprises the steps of
defining a multimedia messaging transport protocol layer as a certain layer above the Internet Protocol layer in certain first and second protocol stacks so that the defined multimedia messaging transport protocol layers are peer entities and
exchanging multimedia-related information between the multimedia messaging transport protocol layer in a terminal arrangement and the multimedia messaging transport protocol layer in a network device arrangement through the use of additionally defined Internet Protocol layers as well as other lower layers in the first and second protocol stacks.

The invention also applies to a terminal which is characterized in that its control block is arranged to
implement a multimedia messaging transport protocol layer in a protocol stack and
exchange multimedia-related information between said multimedia messaging transport protocol layer in the protocol stack and a certain network device arrangement through the use of an Internet Protocol layer as well as other lower layers in the protocol stack.

Additionally the invention applies to a network device which is characterized in that its control block is arranged to
implement a multimedia messaging transport protocol layer in a protocol stack and
exchange multimedia-related information between said multimedia messaging transport protocol layer in the protocol stack and a terminal arrangement through the use of an Internet Protocol layer as well as other lower layers in the protocol stack.

The Internet Protocol or IP is a well-known protocol for routing packet data through a data transmission network. The GPRS standards and proposals that are available to the public at the priority date of this patent application describe the activation and use of a specific PDP Context type for carrying IP packets. According to the invention a PDP Context of the IP type is activated also for the transmission of multimedia-related information. On the basis of the contents of a request message the network devices (mainly the SGSN) are able to route a request for the activation of a PDP Context to an MMSC. As a part of the known PDP Context activation process such an MMSC transmits a response, and according to the invention it indicates its IP address (or the IP address of another, more suitable MMSC) within said response. Dynamic IP address allocation is most advantageously applied to allocate an IP address to the terminal that initiated the PDP Context activation. The dynamically allocated IP address of the terminal is indicated to the MMSC, whereafter the IP addresses of the communicating parties are known to each other and the activated PDP Context of the IP type may be used to transmit multimedia-related information.

The invention has several advantageous features. The dynamic indication of the IP address of the MMSC at the PDP Context activation stage enables more flexible and optimal routing of MMS traffic in the cases where the terminal arrangement is roaming, because the terminal can connect also to other MMSCs than the 'home' MMSC. The invention also avoids static storage of MMSC addresses within the user's terminal or Subscriber Identity Module (SIM), because the MMSC address can be dynamically configured to the MS, The dynamic configuration of MMSC addresses also allows the operator to reconfigure the network and MMSCs to be used for message delivery. Some MMSCs can be e.g. run down in maintenance while other MMSCs take responsibility of the users. Controlled distribution of users and message load is also possible in the suggested solution. The network can dynamically distribute users among a certain group of processing units and/or MMSCs by just allocating different IP addresses for different users.

BRIEF DESCRIPTION OF THE DRAWINGS

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

FIG. 1 has been already discussed above within the description of prior art.

DETAILED DESCRIPTION OF THE INVENTION

Figure 2:
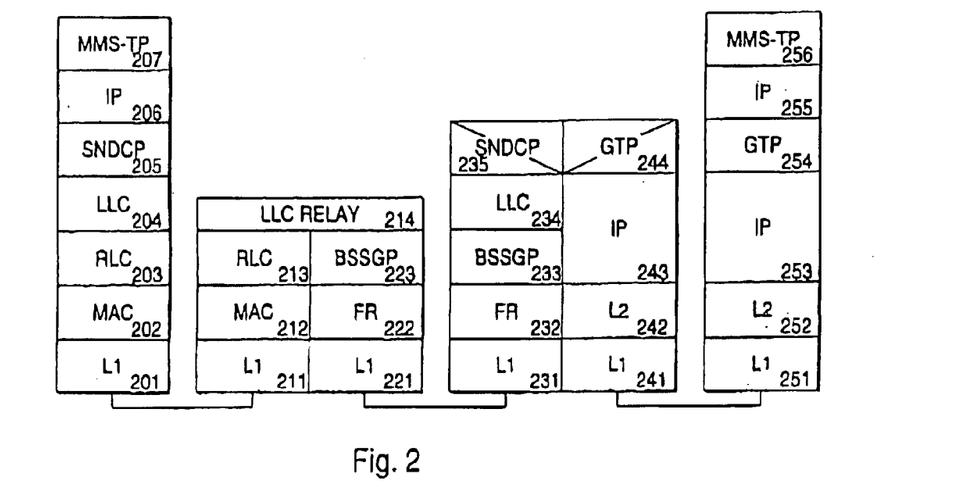
FIG. 2 illustrates an arrangement of protocol stacks according to the invention.

FIG. 2 illustrates an advantageous arrangement of protocol stacks in a terminal or Mobile Station (MS), an Base Station Subsystem (BSS), a Serving GPRS Support Node (SGSN) and a Multimedia Messaging Service Center (MMSC). The notation refers to the application of the invention in association with an enhanced GSM network; this should not be construed as an implicit limitation to the applicability of the invention. In the context of UMTS, for example, the temrunal would be designated as the UE (User Equipment) and the BSS would be substituted by one of the network devices belonging to a UTRAN, e.g. a Node B or a Radio Network Controller. Within the BSS or the UTRAN there may be a specific interface unit that takes care of all data traffic to and from such packet data network that do not share the switching facilities (the core networks) with the cellular telephone systems.

The protocol layers related to the application of the invention in the MS are, from bottom to top, Layer 1 201, Medium Access Control 202, Radio Link Control 203, Logical Link Control 204, Subnetwork Dependent Convergence Protocol 205, Internet Protocol 206 and Multimedia Messaging Service—Transport Protocol 207. Some sources refer to some of these layers as sublayers, which has no practical importance to the present invention. It has to be noted that the "MS" is a general notation for the apparatus or arrangement of apparatuses which are operative at a terminal end: one possible "MS" arrangement is a mobile telephone or other cellular network terminal coupled to a laptop computer, whereby for example the IP protocol layer 206 may reside in the mobile telephone and the MMS-TP protocol layer 207 may reside in the laptop computer. The invention does not require the MMS-TP protocol layer 207 to be immediately on top of the Internet Protocol layer 206; one or several other layers lice UDP (User Datagram Protocol), TCP (Transport Control Protocol) or others night come therebetween.

On the left-hand side of the BSS the three lowest layers 211, 212 and 213 are the same and on top of them there is LLC Relay layer 214 for performing the required conversions between the left-hand and right-hand sides of the BSS. The three right-hand layers of the BSS are, from bottom to top, Layer 1 221, Frame Relay layer 222 and BSS GPRS Protocol layer 223. In the SGSN the three lowest left-hand side layers 231, 232 and 233 are same as on the right-hand side of the BSS, and above them is the Logical Link Control layer 234 which is the peer entity of the similarly named layer in the MS. On the right-hand side of the SGSN there are the Layer 1 241, Layer 2 242 and Internet Protocol 243 layers. On top of the SGSN protocol stack there is a conversion entity consisting of an SNDCP half 235 and a GPRS Tunneling Protocol half 244. The protocol layers of the MMSC are, from bottom to top, Layer 1 251, Layer 2 252, first Internet Protocol layer 253, GPRS Tunneling Protocol 254, second Internet Protocol layer 255 and Multimedia Messaging Service—Transport Protocol 256. Again the invention allows the second Internet Protocol layer 255 and Multimedia Messaging Service—Transport Protocol layer 256 to be separated by one or more other protocol layers therebetween.

Also at the GGSN/MMSC end there may be a division of the protocol layers to those implemented within an actual GGSN (e.g. layers 251 to 255) and those implemented within a separate MMSC entity (e.g. layer 256).

Figure 3:
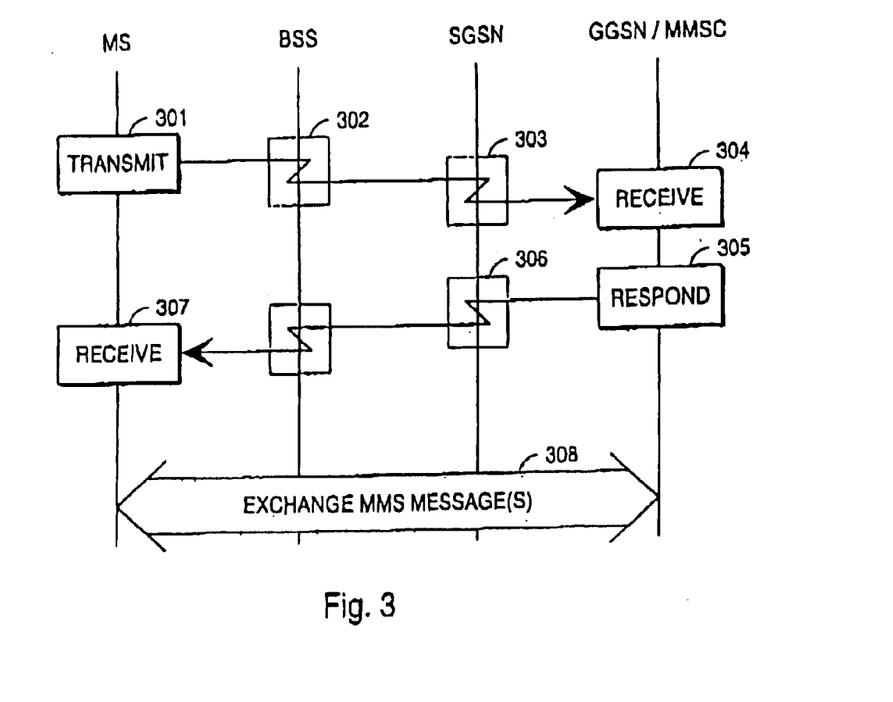
FIG. 3 is a schematic illustration of a method according to the invention.
Figure 4:
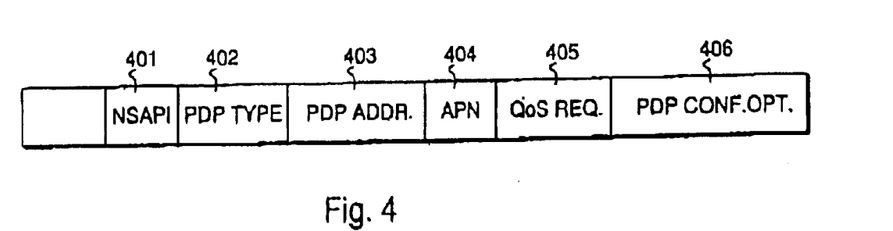
FIG. 4 is a schematic illustration of an Activate PDP Context Request used in association with the invention.
Figure 5:
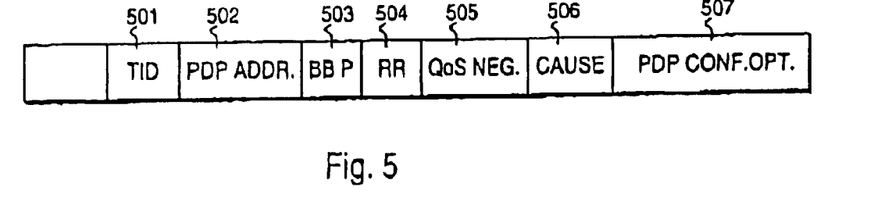
FIG. 5 is a schematic illustration of an Activate PDP Context Response used in association with the invention.

The use of the above-mentioned protocol layers in context of the present invention is explained in more detail in the following, with reference also to FIGS. 3, 4 and 5. As an example we will use a mobile-originated procedure for enabling the exchange of MMS messages between a MS and a MMSC. At step 301 the MS transmits an Activate PDP Context Request message in a way basically known as such. In order to use said message to set up a PDP Context suitable for MMS transmission using tie IP, the MS needs to incorporate a certain set of parameters in the message. These parameters are schematically illustrated in FIG. 4 and they have the following meaning:

The Network Service Access Point Identifier or NSAPI 401 is selected by the MS. NSAPI identifies the PDP context to be activated within the GPRS/UMTS network. For identifying the user die message comprises also the TLLI (Temporary Logical Link Identity) and IMSI (International Mobile Subscriber Identity) information elements (not shown in FIG. 4).

The PDP Type 402 shall have the known specified value that indicates that a PDP Context of the IP type should be activated.

The PDP Address field 403 is most advantageously empty, meaning that the GGSN or combined GGSN/MMSC that will receive the request message must allocate a dynamic IP address for the MS.

The Access Point Name or APN 404 is selected by the MS. For the purposes of the invention, there should be a commonly accepted value for the APN field that corresponds to the meaning "this request message is meant for an MMSC, the address of which is unknown to the sender of the message". We may generally designate the corresponding value as selecting "MMSC" as the APN. It indicates to a SGSN that it should forward the request to an MMSC or to a GGSN coupled to an MMSC. In the latter case (where the MMSC functionality is separated from the GGSN) the GGSN knows—based on the APN value—that the requested PDP Context is for MMS and is able to handle the MMS context activation appropriately.

The QoS Requested 405 (where QoS comes from Quality of Service) is selected by the MS. The requested service quality comprises a number of factors and their selection typically depends on the desired characteristics of the MMS-TP. Of the known reliability classes, class 2 is seen as the most advantageous, meaning RLC&LLC retransmissions as well as the use of UDP (User Datagram Protocol) at the GPRS backbone network. Bit rates can be negotiated to be anything without the invention limiting their negotiation. MMS message transmission is in general time-insensitive, so delay class should reflect that; long delays are allowed. Service precedence is most advantageously high if it indicates dropping precedence which results in few packet losses.

The PDP Configuration Options field 406 can be used e.g. for informing the MMSC about certain capabilities of the MS, such as supported content-types etc. MS-MMSC configuration information can be included in this information element if these are not implemented into the MMS-TP protocol itself. If there are many choices for the MMS-TP protocol (either totally separate protocols or different versions of the same protocol), the PDP Configuration Options can be used for informing the MMSC which protocol(s) the MS supports on top of IP.

At step 302 the BSS recognizes the Activate PDP Context Request message as concerning packet-switched services and consequently routes it to the current SGSN in a known way. At step 303 the SGSN validates the request in a known way and sends a corresponding Create PDP Context Request to a combined GGSN/MMSC or to a GGSN coupled to a MMSC. The known fields in the Create PDP Context Request message are the PDP Type, PDP Address, Access Point Name, QoS Negotiated, TID (Tunnel Identifier), Selection Mode and PDP Configuration Options fields. Of these the ones that are closely related to the present invention are PDP Type (="IP"), PDP Address (empty), Access Point Name (as set by the MS) and PDP Configuration (if it contains e.g. the MMS configuration information referred to above).

At step 304 tie GGSN/MMSC receives the request message and at step 305 it replies with the Create PDP Context Response message the general form of which is known as such. FIG. 5 illustrates schematically a response message with the following fields:

The contents of the Tunnel Identifier or TID field 501 are the same which the SGSN used in its Create PDP Context Request to identify the PDP Context which is about to be activated.

The PDP Address field 502 contains a dynamically allocated IP address for the MS; the dynamic allocation of IP addresses is known as such and is a consequence of the fact that the MS left the corresponding field empty in its Activate PDP Context Request.

The BB Protocol, Reordering Required, QoS Negotiated and Cause fields 503, 504, 505 and 506 are used according to the existing GPRS specifications.

According to the invention the GGSN/MMSC incorporates into this message also its own IP address(es). The most advantageous way is to use the PDP Configuration Options field 507 in the response message to convey the IP-address(es) of the MMSC. Also, if TCP or UDP is to be transparently used on top of UMTS/GPRS bearer, the PDP Configuration Options for MMS protocol may include port number(s) to be used for the communication. This way the MMSC maces itself reachable by a conventional IP packet delivery (TCP or UDP).

The SGSN receives the Create PDP Context Response message and sends the corresponding Activate PDP Context Accept message through the BSS to the MS at step 306; the reception of this message at the MS is designated as 307. The known fields of the last mentioned are the PDP Type, PDP Address, NSAPI, QoS Negotiated, Radio Priority Level and PDP Configuration Options fields. The PDP Configuration Options in this message are exactly the same as set by the MMSC (or the GGSN) in the PDP Context Response message. The IP-address(es) of the MMSC (stored in the PDP Configuration Options parameter) is/are passed to the MMS-layer of the MS. Hence, the MS knows which IP-address to use in the continuation as the destination for MMS messages.

In an advantageous implementation the GGSN part of the GGSN/MMSC functionality is configured to return the MMSC's IP address(es) and possibly also port number(s) without interacting with the MMSC itself. Once the PDP Context for MMS has been established and the GGSN has allocated a dynamic IP address to the user (as usually in the case of known dynamic address allocation of GPRS), the mobile station can start connection establishment, an exchange of MMS messages, or message transmission with the MMSC according to block 308 in FIG. 3. This might require that the MS informs the MMSC (as defined in MS-MMSC protocol) that it is reachable through a particular IP address.

There are several different approaches how to provide service to an MS also if the serving MMSC resides at a visited network:

If the MMSC connected by the MS resides in the visited network, it might be necessary to inform an MMSC at the home network about the user's current location (i.e, the serving MMSC at the visited network). This notification may be carried out as pant of a specific MMSC-MMSC protocol, or the visited MMSC may update the user's Home Location Register or HLR on the serving MMSC address. The latter approach requires addition of two new procedures between the MMSC and HLR; Update MMS Location and Send Routing Info for MMS. The former is used to update serving MMSC information in HLR, while the latter is used by the home network MMSC to request for the IP address of the MMSC currently serving the user (for it to be able to forward the message to the visited network). New HLR parameter, Serving MMSC Address, should be added to HLR records.

Alternative solution between MMSCs: Mobile IP (or Ipv6; Internet Protocol version 6) could be employed between MMSCs so that the home MMSC takes the place of a "home agent" and the visited MMSC takes the place of a foreign agent. The home MMSC address may be given by the user/MS or it may be included in the HLR.

The home MMSC could always be used as the one to deliver an MMS message to its intended recipient. This would probably require the MS to have a fixed IP address, but it would enable the home MMSC to find out immediately if the delivery was unsuccessful.

The activation of the PDP Context for transmitting MMS messages may also take place upon the initiative of the MMSC, for example in such a case where an MMS message has been stored for delivery to an MS which currently does not have an active PDP Context with the MMSC. According to the adopted practice within GPRS, the MS is always the one to transmit the initial Activate PDP Context Request message, but it is possible for the MMSC to indicate to the MS through a simple signalling message that there is a stored MMS message waiting for delivery, so that it is left to the MS's discretion to choose the moment for activating the PDP Context by commencing the procedures illustrated in FIG. 3.

There may also be a kind of alerting arrangement where the indication about undelivered MMS messages is transmitted from the MMSC to some other network device which in turn then forwards the information to the MS. Another alerting arrangement could be such where the MMSC is informed when a MS which previously was not reached becomes reachable.

In other network arrangements than GPRS an MMSC-originating PDP Context activation (though probably with different designations of the participating devices and associated messages) could be nearly identical to the MS-originating one described above, with the exception that the initial activation message and the response thereto would travel into opposite directions than above. The identification information in the former would then serve to identify a particular MS instead of a SGSN-GGSN/MMSC combination, whereby the routing of the message could involve the known inquiries to the location registers which store the current location information of the MS. The IP address(es) of the MMSC as well as the dynamically allocated IP address for the MS can then be incorporated into the activation request message transmitted by the MMSC.

Figure 6:
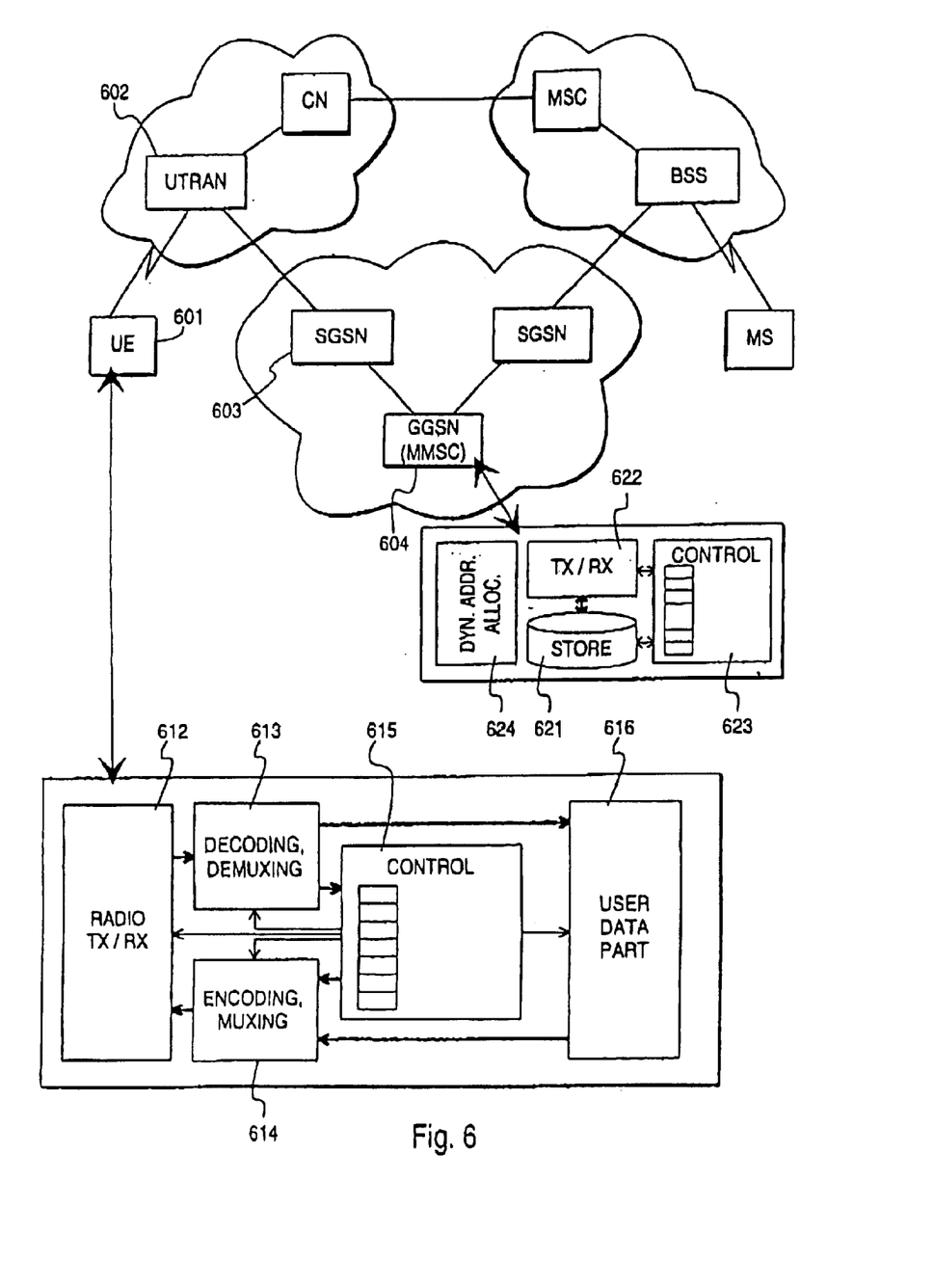
FIG. 6 illustrates schematically an arrangement according to the invention and FIG. 7 summarizes some aspects of certain protocol layers according to the invention.

FIG. 6 illustrates an arrangement according to the invention comprising a terminal or MS (or UE) 601, a BSS or UTRAN 602, a SGSN 603 and a combined GGSN/MMSC 604. The hardware of the terminal comprises a radio transceiver block 612, a decoding/demultiplexing block 613, all encoding/multiplexing block 614, a control block 615 and a user data part 616. The decoding/demultiplexing block 613 is arranged to separate received signalling information from received user data and to direct the former into the control block 615; similarly the encoding/multiplexing block 614 is arranged to take signalling information from the control block 615 and to multiplex it for transmission with user data coming from the user data part 616. All other blocks operate under the supervision of the control block. The control connections are shown with thinner lines than the user data and signalling information connections. The MS protocol stack seen in greater detail in FIG. 2 is implemented within the control block 615 by programming the corresponding operations into a memory in the form of machine-readable processing instructions. If the terminal arrangement comprises a number of separate functional, entities, the control block may be understood to consist of the control functions distributed into the physical controlling entities of the separate devices.

The MMSC is basically a large-capacity data storage 621 with a transmission unit 622 arranged to couple it to the trunk lines of the GPRS network (or a corresponding packet data network) as well as a control unit 623 to control the setting up, maintaining and tearing down of connections. The MMSC protocol stack seen in greater detail in FIG. 2 is implemented within the control block 623 by programming the corresponding operations into a memory in the form of machine-readable processing instructions. For implementing the dynamic IP address allocation the GGSN/MMSC entity comprises also a dynamic address allocation unit 624 which is known as such; for the purposes of the invention the dynamic address allocation unit 624 may also be arranged to insert into suitable Create PDP Context Response messages the IP address(es) of the MMSC so that interaction between the GGSN functionality and the MMSC functionality is not required at the PDP Context activation stage.

Figure 7:
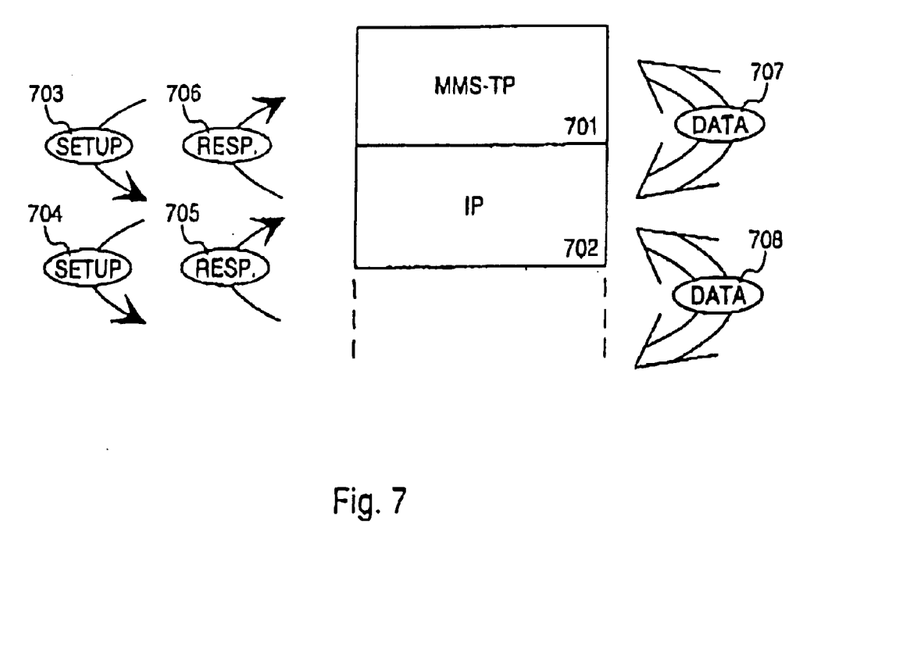

FIG. 7 summarizes the functions of the MMS-TP, IP and lower protocol layers in a MS. The MMS-TP protocol layer 701 is arranged to indicate to the IP layer 702 the need for setting up a PDP Context of the IP type with a first primitive 703; this primitive should contain at least the APN, QoS Requested and PDP Configuration Options information elements referred to above. The IP layer 702 is in general capable of indicating to the lower layers the need for setting up PDP Contexts, and especially capable of indicating with a setup request primitive 704 that a PDP Context of the IP type should be requested. This second primitive 704 should contain at least the PDP Type, APN, QoS Requested and PDP Configuration Options information elements referred to above. The lower layers are in general capable of informing the IP layer 702 about the completed activation of the PDP Context with a third primitive 705, and the IP layer 702 is in turn capable of forwarding the same information to the MMS-TP layer 701 in a fourth primitive 706.

Setting up the PDP Context could also involve separate control protocol entities. In any case, during operation the MMS-TP layer 701 is arranged to exchange user data with the IP layer according to the arrow 707, and the IP layer is arranged to transmit the user data to be transmitted further down in the protocol stack according to arrow 708.

Supposing that the activation of the IP type PDP contexts for MMS use always takes place upon the initiative of the MS, the existence of primitives 703 and 704 would not be required at the GGSN/MMSC end. In any case it must be noted that the IP layer 702 of FIG. 7 corresponds to the second or upper IP layer in the GGSN/MMSC protocol stack. Tearing down the IP type PDP Context follows the known procedures of tearing down PDP Contexts,

What is claimed is:

1. A method for setting up an active connection for transmitting multimedia-related information between a terminal arrangement and a network device arrangement coupled to a packet-switched data transmission network, comprising:
    defining a first protocol'stack for the terminal arrangement and a second protocol stack for the network device arrangement, the protocol stacks consisting of layers, for arranging the mutual exchange of information between the terminal arrangement and the network device arrangement;
    defining an Internet Protocol layer for the transmission of packetized data as a certain layer in the first protocol stack and a certain layer in the second protocol stack so that the defined Internet Protocol layers are peer entities;
    defining a multimedia messaging transport protocol layer as a certain layer above the Internet Protocol layer in the first and second protocol stacks so that the defined multimedia messaging transport protocol layers are peer entities;
    conveying a request for activating an exchange of multimedia-related information between the terminal arrangement and the network device arrangement;
    dynamically allocating an address to the terminal arrangement for identifying the terminal arrangement to the network device arrangement on the Internet Protocol level in response to the activation request;
    conveying a response including the dynamically allocated address in response to the activation request; and
    exchanging multimedia-related information between the multimedia messaging transport protocol layer in the terminal arrangement and the multimedia messaging transport protocol layer in the network device arrangement through the use of the defined Internet Protocol layers as well as other lower layers in the first and second protocol stacks.

2. A method according to claim 1, wherein conveying a request for activating the exchange of multimedia-related information comprises:
    conveying a primary request from the terminal arrangement to a routing device, said primary request comprising, as a substitute to an exact recipient address, a general indication that said primary request is related to the activation of the exchange of multimedia-related information; and
    on the basis of said general indication, conveying from said routing device to the network device arrangement a secondary request.

3. A method according to claim 2, wherein said primary request is an Activate PDP Context Request message comprising:
    a Network Service Access Point Identifier for identifying the PDP context to be activated;
    a PDP type value for identifying the protocol as Internet Protocol;
    a dummy Access Point Name for indicating that said Activate PDP Context Request is related to the activation of the exchange of multimedia-related information;
    a QoS Requested field for indicating the requested quality of service for the PDP context to be activated; and
    a PDP Configuration Options field for carrying other information related to the PDP context to be activated,
and wherein said secondary request is a Create PDP Context Request message.

4. A method according to claim 1, wherein conveying a response comprises:
    conveying a primary response from the network device arrangement to a routing device, said primary response comprising an address for identifying the network device arrangement to the terminal arrangement on the Internet Protocol level and
    conveying from said routing device to the terminal arrangement a secondary response comprising said address.

5. A method according to claim 4, wherein said primary response is a Create PDP Context Response message comprising a PDP Configuration Options field to convey said address, and said secondary response is an Activate PDP Context Accept message.

6. A terminal arrangement for exchanging multimedia-related information with a network device arrangement through a packet-switched data transmission network, comprising:
    a radio transceiver block;
    a control entity;
    a user data part;
    a decoding/demultiplexing block arranged to separate received signalling information from received user data and to direct the former into the control entity; and an encoding/multiplexing block arranged to take signalling information from the control entity and to multiplex it for transmission with user data coming from the user data part, wherein the control entity is arranged to:

implement a protocol stack and an Internet Protocol layer for the transmission of packetized data as a certain layer in the protocol stack, for arranging the mutual exchange of information between the terminal arrangement and the network device arrangement, which Internet Protocol layer is adapted to act as a peer entity to a corresponding Internet Protocol layer in the network device arrangement;

implement a multimedia messaging transport protocol layer in the protocol stack, which multimedia messaging transport protocol layer is adapted to act as a peer entity to a corresponding multimedia messaging transport protocol layer in the network device arrangement;

send a request for activating the exchange of multimedia-related information with the network device arrangement;

receive a dynamically allocated address for identifying the terminal arrangement to the network device arrangement on the Internet Protocol level in response to the activation request; and exchange multimedia-related information between said multimedia messaging transport protocol layer in the protocol stack and the network device arrangement through the use of the Internet Protocol layer as well as other lower layers in the protocol stack.

7. A terminal arrangement according to claim 6, comprising a communication device and a presentation device coupled to said communication device, whereby the control entity consists of parts distributed into said communication device and said presentation device, so that said Internet Protocol layer is implemented in said communication device and said multimedia messaging transport protocol layer is implemented in said presentation device.

8. A network device arrangement for exchanging multimedia-related information with a terminal arrangement through a packet-switched data transmission network, comprising:

a transmission unit, a control entity and a data storage;

wherein the control entity is arranged to:

implement a protocol stack and an Internet Protocol layer for the transmission of packetized data as a certain layer in the protocol stack for arranging the mutual exchange of information between the network device arrangement and the terminal arrangement, which Internet Protocol layer is adapted to act as a peer entity to a corresponding Internet Protocol layer in the terminal arrangement;

implement a multimedia messaging transport protocol layer in the protocol stack, which multimedia messaging transport protocol layer is adapted to act as a peer entity to a corresponding multimedia messaging transport protocol layer in the terminal arrangement;

receive a request for activating the exchange of multimedia-related information with the terminal arrangement; and exchange multimedia-related information between said multimedia messaging transport protocol layer in the protocol stack and the terminal arrangement through the use of the Internet Protocol layer as well as other lower layers in the protocol stack utilizing a dynamically allocated address for identifying the terminal arrangement to the network device arrangement on the Internet Protocol level generated in response to the request for activation.

9. A network device arrangement according to claim 8, comprising a node device of the packet-switched data transmission network and a multimedia messaging device coupled to said node device, whereby the control entity consists of parts distributed into said node device and said multimedia messaging device, so that said Internet Protocol layer is implemented in said node device and said multimedia messaging transport protocol layer is implemented in said multimedia messaging device.

10. The method of claim 1, wherein the request is generated as a result of a message from the network device arrangement.

11. The terminal arrangement of claim 6, wherein the control entity sends the request for activating the exchange of multimedia-related information as a result of a message from the network device arrangement.

12. The network device arrangement of claim 8, wherein the terminal arrangement sends the request for activating the exchange of multimedia-related information as a result of a message from the network device arrangement.

* * * * *